United States Patent [19]

Rutter

[11] 4,269,000
[45] May 26, 1981

[54] FIXTURE FOR ALIGNING AND LOCATING THE AXIS OF ROTATION OF A ROTATABLE MEMBER

[75] Inventor: Harold T. Rutter, Kirkwood, Mo.

[73] Assignee: Sunnen Products Company, St. Louis, Mo.

[21] Appl. No.: 81,624

[22] Filed: Oct. 4, 1979

[51] Int. Cl.³ .......................... B24B 49/00; G01B 5/24
[52] U.S. Cl. ................................ 51/165.74; 33/185 R
[58] Field of Search ............. 33/185 R, 174 Q, 169 C, 33/172 D; 51/165 R, 165.74

[56] References Cited

U.S. PATENT DOCUMENTS

| | | | |
|---|---|---|---|
| 536,103 | 3/1895 | Snyder | 33/185 R |
| 1,553,814 | 9/1925 | Hansen | 33/169 C |
| 2,029,665 | 2/1936 | Markowicz | 33/185 R |
| 2,420,572 | 5/1947 | Southwick | 33/185 R |
| 2,876,822 | 3/1959 | Groves | 33/174 Q |
| 3,781,999 | 1/1974 | Colangelo | 33/185 R |
| 3,826,011 | 7/1974 | D'Aniello | 33/172 D |
| 4,118,872 | 10/1978 | Ziegelmeyer | 33/185 R |

*Primary Examiner*—Harold D. Whitehead
*Attorney, Agent, or Firm*—Haverstock, Garrett & Roberts

[57] ABSTRACT

An alignment fixture for use with an adjustable spindle nose device that rotatably supports a working member such as a honing mandrel to axially align the mandrel so that it rotates about a fixed axis along its length, the fixture comprising a housing having attached structure for mounting on a machine adjacent to a rotatable member to be aligned, an adjustable contact assembly including a first contact member mounted on the housing in position to engage the member to be aligned at one location therealong, a second contact assembly including a second contact member spaced from the first contact member for engaging the member to be aligned, apparatus for movably supporting the second contact assembly on the housing in position so that the second contact member is biased into engagement with the member to be aligned at a location axially spaced from the adjustable contact, an indicator assembly on the housing including a graduated scale and an indicator member movable relative to the scale, an operative connection between the second contact assembly and the movable indicator member whereby the indicator member indicates on the scale the position of the second contact member relative to the first contact member when both contacts are engaged with the member to be aligned, and apparatus for adjusting the position of the housing and the first and second contact assemblies thereon relative to the member after it is aligned to laterally locate the rotatable member.

11 Claims, 9 Drawing Figures

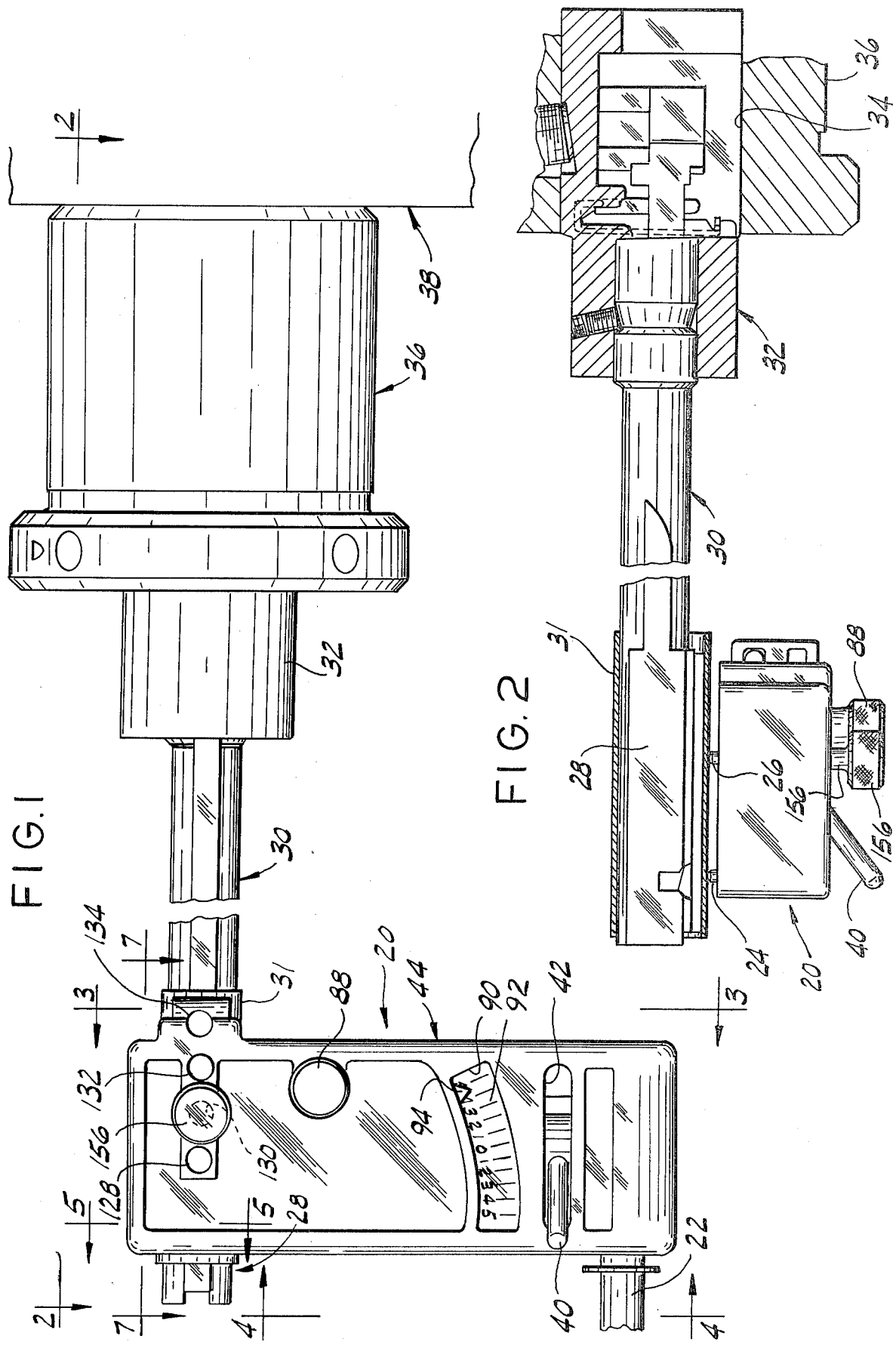

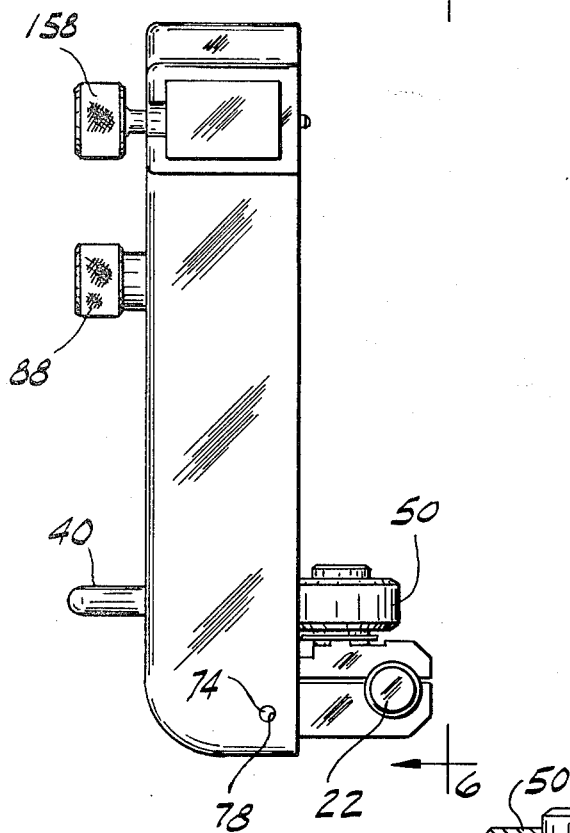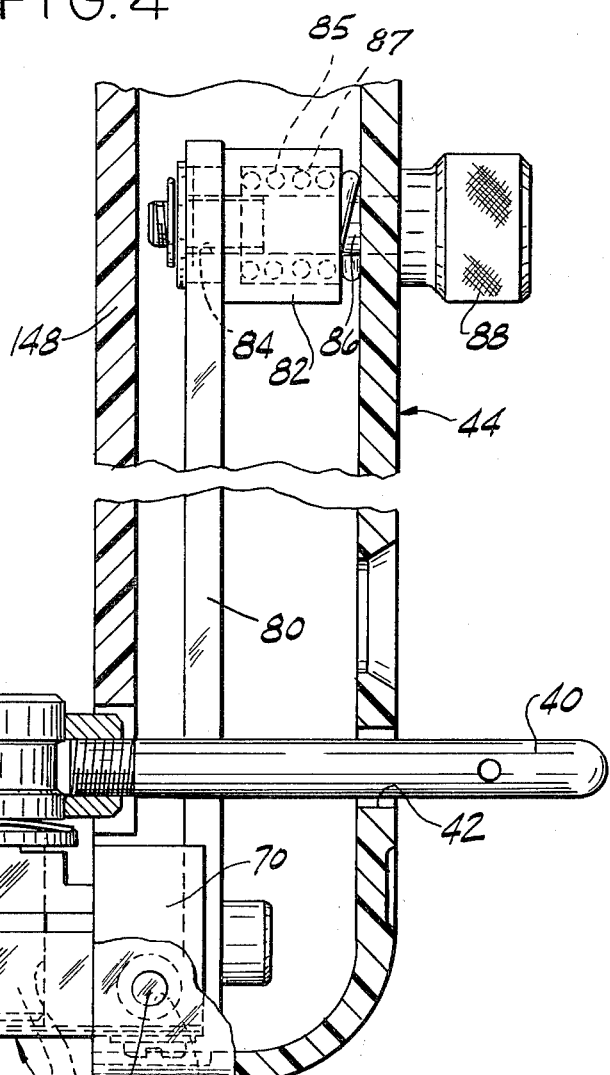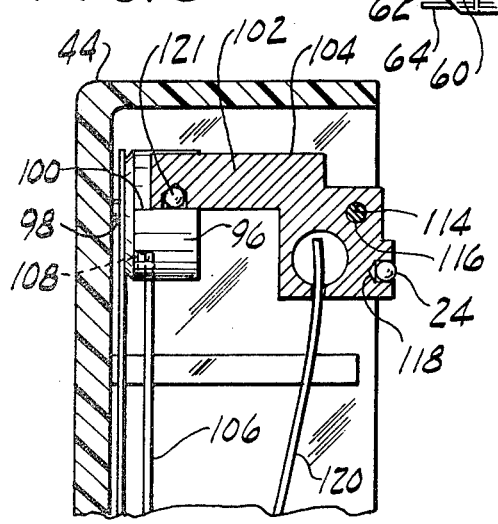

FIXTURE FOR ALIGNING AND LOCATING THE AXIS OF ROTATION OF A ROTATABLE MEMBER

The present invention is particularly useful for aligning and positioning rotatable members including rotatable work engaging members such as honing mandrels which are mounted in adjustable spindle noses such as disclosed in copending Rutter application entitled Spindle Nose For Machine Tools and filed contemporaneously herewith, assigned to the same assignee. The subject fixture is especially useful to enable accurate adjustment of the spindle nose for aligning and positioning the axis of rotation of a member mounted therein.

One of the problems of using a rotating member to machine or otherwise work on surfaces such as cylindrical surfaces is the inability to be able to manufacture parts so accurately that even slight variations in rotation of a rotatable member about a fixed axis can be eliminated. Even slight manufacturing tolerances as well as wear and strain on the parts caused by rough handling or otherwise will produce error, and this will usually be manifested as misalignment or off axis movement of the rotatable parts during operation thereof. Rutter copending U.S. patent application Ser. No. 81,625 entitled Spindle Nose For Machine Tools filed contemporaneously herewith discloses the construction of a rotatable machine mounting assembly or spindle nose that is adjustable to axially align and laterally position a rotatable work engaging member supported thereby. The present alignment fixture is designed to be used with such a spindle nose when aligning and positioning the axis of rotation of a rotatable member. To this end the subject fixture is mounted on the machine tool such as on a honing machine adjacent to the work engaging rotatable member to be aligned or to a sleeve mounted thereon for engagement therewith. When so positioned the spindle nose is adjusted using the present fixture when engaged with the rotatable member in several different positions thereof to obtain precise axial alignment and positioning of the work engaging member. In this way extremely accurate rotational alignment can be obtained so as to overcome even slight manufacturing errors or tolerances in the machine parts, and defects, however slight, in the rotatable member and in the mounting means therefor and to compensate for wear. Furthermore, with the present alignment fixture, each time a different mandrel is mounted on the machine it can be quickly and accurately aligned and positioned, and the present fixture can be used to align and position rotatable members of different lengths.

It is therefore a principal object of the present invention to increase the accuracy of machine tools such as honing machines that employ rotatable work engaging members.

Another object is to provide a relatively simple, easy to install and operate fixture than can be used in the accurate alignment and positioning of the axis of rotation of a rotatable member.

Another object is to provide an alignment fixture that is adjustable to engage rotatable members at axially spaced locations therealong for alignment purposes, the axial spacing between the engaged locations being adjustable depending on the length of the rotatable member to be aligned.

Another object is to overcome even slight misalignment errors in rotatable members due to manufacturing limitations, wear of parts, and imperfections caused by rough handling.

Another object is to provide relatively simple means to install an alignment fixture in operative position on a machine tool.

Another object is to provide means to predeterminately secure an alignment fixture in position on a machine tool adjacent to a rotatable member to be aligned and yet provide some adjustment in the position thereof and of the parts thereon that contact the member to be aligned.

Another object is to enable accurate axial alignment of members mounted for rotation in adjustable mounting assemblies.

Another object is to provide means to locate the axis of rotation of a rotatable member so that the member will rotate with minimum wobble about its true axis.

Another object is to establish the axis of rotation of a rotatable member taking into account wear of the parts thereof.

These and other objects and advantages of the present alignment and positioning fixture will become apparent after considering the following detailed specification of a preferred embodiment thereof in conjunction with the accompanying drawings, wherein:

FIG. 1 is a top plan view showing the subject fixture mounted on a honing machine in operative engagement with a honing mandrel mounted in an adjustable spindle nose assembly;

FIG. 2 is an end view, partly in section, taken on line 2—2 of FIG. 1;

FIG. 3 is a side view of the subject fixture taken on line 3—3 of FIG. 1;

FIG. 4 is an enlarged, cross-sectional view taken on line 4—4 of FIG. 1;

FIG. 5 is an enlarged, fragmentary, cross-sectional view taken on line 5—5 of FIG. 1;

Figure 6:
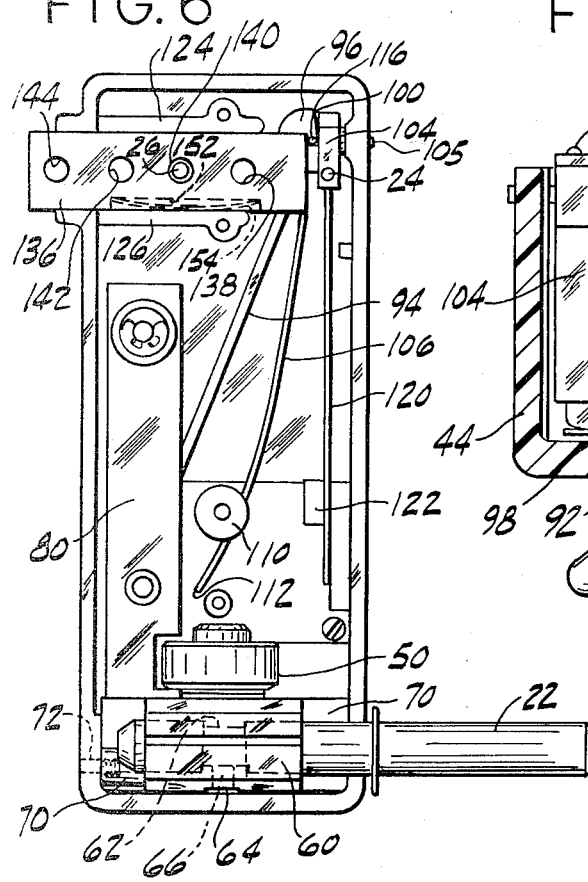
FIG. 6 is a bottom view of the subject fixture taken on on line 6—6 of FIG. 3 with the bottom wall removed.

Referring to the drawings more particularly by reference numbers, number 20 refers to a fixture constructed according to the present invention. The fixture 20 is shown in FIG. 1 mounted on a shaft 22 which is maintained in fixed position. The fixture 20 has two spaced work engaging contacts 24 and 26 (FIG. 2) which engage axial spaced locations along the outer surface of a sleeve-like member, such as sleeve 31, which is positioned on the work engaging portion 28 of a rotatable member to be aligned, such as honing mandrel 30. The sleeve 31 is selected to have an inner surface diameter of the same size as the finished hole to be honed and an outer surface that is concentric with the inner surface for reasons which will become apparent hereinafter. The mandrel 30 is supported by an adapter assembly 32 which may be similar to the adapters shown in U.S. Pat. No. 2,376,851, dated May 22, 1945 and copending application Ser. No. 053,884, filed July 2, 1979, and the adapter 32 is mounted in a bore 34 in a rotatable spindle nose assembly 36. The spindle nose assembly 36 is adjustable to align and locate the axis of rotation of the mandrel 30 by means disclosed in copending Rutter U.S. patent application entitled Spindle Nose For Machine Tools and filed contemporaneously herewith, which is assigned to Applicant's assignee. The present fixture 20 is used in conjunction with the spindle nose assembly 36 to align the mandrel 30 so that the axis of rotation thereof will remain coincident with the true axis of the mandrel, thereby eliminating or minimizing wobble, and to position the mandrel in relation to the spindle nose to eliminate or minimize eccentricity. Two steps are required in the use of the fixture 20: the first involves use of two spaced contacts to align the mandrel so that it will rotate about the true axis of the mandrel and honing stone, and the second step involves use of only one of the contacts to laterally locate the mandrel so that any eccentricity of movement of the mandrel and honing stone during a honing operation will be minimized.

To understand the structure of the present device an explanation as to how it is used will be helpful. Referring again to FIGS. 1 and 2, the present device is shown mounted on the fixed shaft 22 which is in spaced parallel relation to the mandrel 30 to be aligned. When so mounted the fixture 20 can be rotated about the shaft 22 to bring the sleeve engaging contacts 24 and 26 into engagement with the sleeve 31. The fixture 20 must not be locked in position when establishing angular alignment of the axis of rotation of the mandrel but is locked in position by means of a locking lever 40 when establishing the lateral position of the mandrel. The locking lever 40 extends through an elongated opening 42 in the fixture housing 44. The housing 44 has an outwardly extending split mounting portion 46 (FIG. 4) that has a bore 48 through which the shaft 22 extends. The locking lever 40 is attached to a collar 50 which is mounted on a threaded member 52 that extends through a hole 54 in portion 56 of the mounting portion 46 and cooperates with a threaded bore 58 in split portion 60 (FIG. 4). When the lever 40 is moved in one direction the threaded member 52 brings the portions 56 and 60 together into fixed or locked position of the fixture 20 on the shaft 22. In the opposite position of the locking lever 40 the fixture is freely rotatable on the shaft 22.

The shaft 22 has an annular fixture locating groove 62 formed therein at an intermediate location, and the split portion 60 has a spring member 64 (FIGS. 4 and 6) attached thereto. The member 64 has a plunger portion 66 that extends through an opening 68 in the portion 60 and into the bore 48. The plunger 68 cooperates with the groove 62 in the shaft 22 when the fixture 20 is positioned thereon to locate the fixture and prevent it from moving axially therealong. The location of the groove 62 is selected to position the work engaging members or contacts 24 and 26 so that they will engage the sleeve 31 mounted upon the mandrel 30 surrounding the honing portion 28 at axial spaced locations therealong.

The mounting portion 46 extends into the housing 44 near one end thereof and has a portion 70 that is rotatably connected to opposite side walls of the housing 44 by pivot members 72 (FIGS. 4 and 6) and 74 (FIG. 3) which extend through respective aligned housing bores 76 and 78. The inner surface of the portion 70 is attached to one end of an elongated arm 80 which extends along the inside of the housing 44 for attachment adjacent at its opposite end to a tubular member 82 which has a threaded bore 84 therethrough. The bore 84 cooperates with a threaded member 86 that is journaled for rotation in the upper wall of the housing 44. A coil spring 85 is positioned in bore 87 in tubular member 82 to bias adjusting knob 88 into engagement with the housing 44. The threaded member 86 has a knob 88 located on its upper end, and when the knob 88 is rotated it moves the housing 44 relative to arm 80 about the pivot members 72 and 72, which also effects limited rotation of the contacts 24 and 26 mounted on the housing 44 about the pivot members 72 and 74. The tubular member 82, in addition to providing a threaded connection for the member 86, also limits the amount of possible angular movement of the housing 44 relative to the pivot members 72 and 74. The fixture 20 can be mounted and locked in position fairly accurately by hand when locating the axis of rotation of the mandrel 30 and only relatively fine positional adjustment is usually required by means of the knob 88 to establish a desired scale reading as will be explained.

When the fixture 20 is mounted in the position described, the contacts 24 and 26 are moved into engagement with the alignment sleeve 31 mounted surrounding the mandrel portion 28. In order to align and locate the mandrel 30, however, the actual adjustments are made by means in the spindle nose assembly 36 in the manner disclosed in copending Rutter U.S. application Ser. No. 81,625 entitled Spindle Nose For Machine Tools and filed contemporaneously herewith which is incorporated herein by reference. The fixture 20 therefore is necessary as a means to know when the spindle nose 36 is in proper adjustment.

Figure 7:
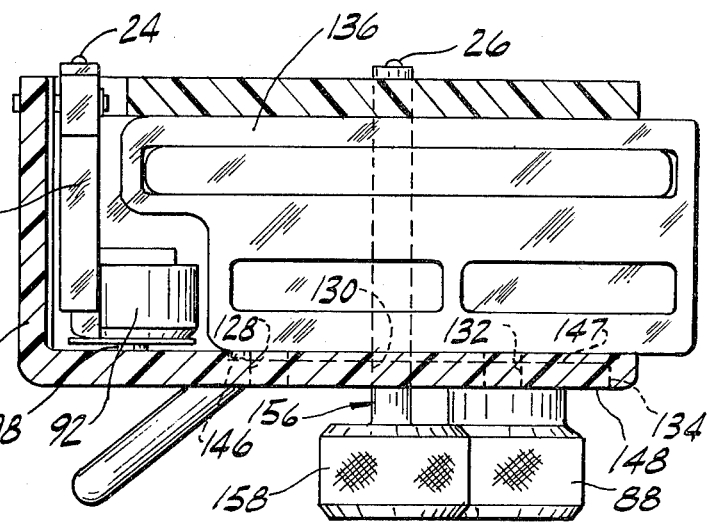
FIG. 7 is an enlarged, fragmentary, cross-sectional view taken on line 7—7 of FIG. 1.

The upper surface of the housing 44 has an elongated arcuate opening 30 (FIG. 1) which is positioned near the opening 42 for the lever 40. The opening 90 outlines a graduated scale 92 which has a zero position at its center and equally spaced intervals on both opposite sides thereof. A movable pointer 94 has its indicator end visible in the opening 90 in front of the scale 92 and is mounted for movement in the housing as will be explained. The pointer 94 is connected to a substantially cylindrical member 96 (FIGS. 5-7) which is journaled to the housing 44 by a shaft 98. The member 96 has a notch 100 formed in one side which engages one end 102 of a bell crank member 104 which is journaled to the side wall of the housing at 105 (FIG. 6). The member 96 is biased into engagement with the bell crank 104 by a wire spring 106 which has one end that extends into a hole 108 in the member 96 and from there around a spring adjusting cam 110 (FIG. 6). and its opposite end is anchored to the housing 44 at 112.

The bell crank 104 (FIG. 5) extends from the end 102 that is engaged with the notch 100, and is pivoted to the housing 44 by a hole 114 which cooperates with a shaft 116 attached to the housing 44. The bell crank 104 also has a cavity 118 in one end in which the contact 24 is positioned and staked. The contact 24 is a small metal ball member preferably made of some relatively hard wear resistant material. The bell crank 104 has means for receiving one end of another wire spring 120 which extends around another spring adjusting cam 122 (FIG. 6) and has its opposite end anchored to the housing 44. The spring 120 biases the bell crank 104 into engagement with the member 96 through another small metal ball 121 which is pressed into the bellcrank, and also biases the contact 24 into a normally outwardly extending position on the housing 44.

The housing 44 has a pair of spaced parallel interior walls 124 and 126 (FIG. 6) which are positioned on opposite sides of a row of housing openings 128, 130, and 132, which openings can be seen most clearly in FIG. 1. Part of an adjacent opening 134 on one side of the housing 44 is also in the same row. A block member 136 (FIG. 6) is slidably positioned in the space between the walls 124 and 126. The block 136 has four aligned threaded bores 138, 140, 142 and 144 therethrough, and the block 136 has a projection 146 (FIG. 7) extending from the top surface thereof near one side which slidably cooperates with a groove 147 formed in housing wall member 148. The block 136 has a cutout 152 formed in one side which receives a curved spring member 154 that makes sliding engagement with the housing wall 126 to prevent looseness therebetween.

Figure 8:
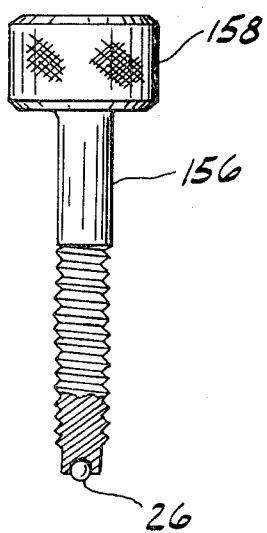
FIG. 8 is a side view of the adjustable work engaging contact assembly employed in the present device.
Figure 9:
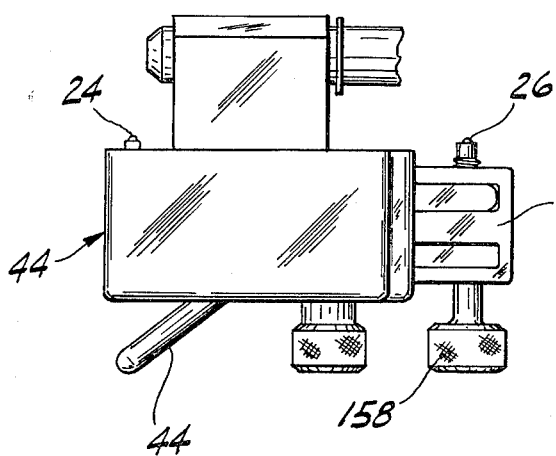
FIG. 9 is an end view similar to FIG. 2 of the subject fixture but with the mounting for the adjustable work engaging contact shown in an extended position to increase the distance between the work engaging members.

The holes 128-134 and the threaded bores 138-144 are movable into alignment with each other in different positions of the block member 136. Any one of the registered holes and bores can receive a threaded member 156 (FIG. 8) which has the contact 26 staked into one end thereof and a knob portion 158 on the opposite end. The member 156 extends through a selected one of the holes 128-134 and is threadedly engageable with a corresponding registered bore 138-144. The member 156, when used, therefore extends all the way through the housing 44 so that the contact 26 and the spring biased contact 24, which is in alignment therewith, are movable into engagement with the mandrel portion 28 or the sleeve 31, at spaced locations therealong. The selection as to which hole and bore to install the member 156 in depends on the length of the mandrel portion 28. The longer the portion 28, the further apart should the contacts 24 and 26 be located. If the mandrel portion 28 is longer than the width of the housing 44 then the member 156 should be installed in the endmost threaded bore 144 in the block 136, and the block 136 can additionally be slid out of the housing between the parallel wall portions 124 and 126, being limited by engagement between the projection 146 on one side of the block 136 and the end of the groove 147 in the housing closure member 148. The further apart the contacts 24 and 26 are, the more precise will be the alignment accuracy that can be achieved.

In order to align a mandrel, such as a mandrel utilized with the adjustable spindle nose disclosed in copending Rutter U.S. patent application Ser. No. 081,625 using the subject fixture 20, the sleeve 31 having an inner surface diameter equal to that of the finished hole to be honed and an outer surface concentric with the inner surface of the sleeve is installed around the honing portion 28 of the mandrel 30. The sleeve 31 is used in order to establish the actual condition of the mandrel during honing. Installation is accomplished by positioning the sleeve on the mandrel portion 28 and adjusting the stone radially outwardly so that the mandrel shoes and stone are snugly engaged with the inner surface of the sleeve 31. The fixture 20 is then installed on the shaft 22, as aforesaid, and, while loose on the shaft 22, is moved into position so that the contact 24 engages the outer surface of sleeve 31. The contact 26 is then adjusted to also engage the outer surface of sleeve 31. In this position the forward set of adjustment screws on the spindle nose are adjusted to achieve angular alignment of the axis of the mandrel so that in all positions of the mandrel the same reading will be present on the fixture scale with both contacts 24 and 26 engaging the outer surface of the sleeve 31. When this condition is achieved the angular alignment of the mandrel axis is the true alignment with the honing machine spindle. The mandrel 30 should be rotated to several different positions during alignment. The object is to adjust the spindle nose assembly 36 so that the fixture 20 will have the same reading, preferably a zero reading, because a zero reading is at the center of the scale, for all positions of rotation of the mandrel 30. With a little practice an operator can accurately align a mandrel so that the axis of rotation will be fixed along the length thereof.

After mandrel angular alignment is achieved using both the contacts 24 and 26, the locking lever 40 is placed in the locked position, thus locking the fixture on shaft 22. The contact 26 is then backed off so that only the contact 24 is in engagement with the outer surface of the sleeve 31. The threaded adjustment members at the rear of the spindle nose assembly are then adjusted to locate the axis of the mandrel on the axis of the honing machine spindle. While making this adjustment the pointer 94 can be maintained at zero by adjusting the knob 88. In order for the mandrel axis to be accurately located, rotation of the mandrel with the sleeve 31 thereon, and with the contact 24 engaging the sleeve, should not produce any change in the fixture reading.

Once a mandrel has been aligned and located as aforesaid, the sleeve 31 is removed from the mandrel. The mandrel is now in condition for extremely accurate honing. The subject fixture can also be used as a means to quickly and accurately verify the alignment and location of a mandrel to compensate for wear and to improve the operation. While the subject fixture has been described in conjunction with a honing mandrel it is apparent that it can be used for the same or similar purposes with other rotatable members including other rotatable work engaging members.

Thus there has been shown and described a novel alignment and locating fixture which fulfills all of the objects and advantages sought therefor. It will be apparent to those skilled in the art, however, that many changes, modifications, variations, and other uses and applications of the present fixture are possible and contemplated. All such changes, modifications, variations, and other uses and applications which do not depart from the spirit and scope of the invention are deemed to be covered by the invention which is limited only by the claims which follow.

What is claimed is:

1. An alignment fixture for use in aligning the rotational axis of a rotatable member mounted on a device, the device having a shaft in spaced relation to the rotatable member comprising a housing structure having first and second end portions, means on one end portion for mounting the housing structure on the shaft, means adjacent to the second end portion for engaging a rotatable member to be aligned, said engaging means including a pair of spaced contacts for engaging the rotatable member at axially spaced locations therealong, one of the said pair of spaced contacts including means threadedly engageable with the housing structure, the other of said contacts including means pivotally mounting the other contact on the housing structure, scale means on the housing structure and a movable indicator having a first portion movable adjacent to the scale means to provide a scale reading and a second portion operatively connected to the other contact, and means to lock the housing in fixed position on the shaft.

2. The fixture of claim 1 including means to adjust the orientation of the housing structure relative to the shaft when the housing structure is locked in fixed position thereon.

3. The fixture of claim 1 including spaced means on the housing structure for accommodating said one of the pair of spaced contacts, said means including a plurality of spaced openings therethrough.

4. The fixture of claim 1 including means on the housing structure biasing the other contact into an outwardly extending position thereon.

5. The fixture of claim 1 including means to prevent axial movement of the housing structure on the mounting shaft.

6. A fixture for aligning and locating a rotatable member so that the axis of rotation of the member will remain coincident with the true axis of the member, means for supporting the rotatable member during rotation thereof including a mounting assembly having means adjustable to align the rotatable member axially and other means for locating the center of rotation of said member, comprising a housing structure having opposite end portions, means adjacent one end portion of the housing structure for mounting the housing structure for movement of the opposite end portion thereof relative to the rotatable member to be aligned and located, means adjacent to said opposite end portion of the housing structure for engaging the rotatable member to be aligned and located, said engaging means including a first contact member and means on the housing pivotally mounting said first contact member for movement thereon relative to the housing structure and the member to be aligned and located, scale means on the housing and a movable indicator operatively connected to the movable first contact member whereby the position of the movable contact member indicates on the scale the relative position of the movable contact on the housing, means to lock the housing in fixed position with the movable first contact member engaging the rotatable member, a second contact member on the housing structure spaced from the first contact member in position for engaging the rotatable member at a spaced axial location therealong, and means for adjusting the position of the second contact member on the housing whereby the rotatable member is aligned and located when both of the contacts are in engagement therewith.

7. The fixture defined in claim 6 wherein the rotatable member is a honing mandrel having a radially movable stone thereon, and a sleeve mounted on said honing mandrel for engagement by the first and second contacts during alignment and locating of the mandrel.

8. The fixture defined in claim 6 including means to angularly reposition the housing relative to the rotatable member when the housing is locked in fixed position.

9. The fixture defined in claim 6 including means on the housing for mounting the second contact member in different positions thereon spaced from the movable first contact member.

10. The fixture defined in claim 6 including means for maintaining the housing in a fixed position axially relative to the rotatable member.

11. A fixture for aligning and locating the end-to-end axis of rotation of a member mounted for rotation in a rotatable support structure having means thereon for rotatably supporting the member including for adjusting the position of the axis of rotation of the member to be aligned therein comprising a housing having spaced portions, means adjacent to one of said spaced housing portions for mounting the housing for pivotal movement of the housing portions relative to the member to be aligned, a first contact assembly mounted adjacent to said other housing portion including a first contact thereon for movement into engagement with the member whose axis of rotation is to be aligned, means on the housing for biasing the first contact outwardly on the housing into a normally extended position thereon, a second contact assembly having a second contact thereon mounted on the other housing portion, said second contact assembly being positionally adjustable on the other housing portion in position for engaging the member to be aligned at a location axially spaced therealong from the first contact, indicator means on the housing including a scale and a pointer movable relative to the scale, and means operatively connecting the pointer to the first contact for movement relative to the scale in response to the extended position of the first contact assembly on the other housing portion, the relative position of the first and second contacts when engaged with the member to be aligned being used to establish the end-to-end alignment and location of the axis of rotation of the member.

* * * * *